US011101576B2

(12) United States Patent
Hauck et al.

(10) Patent No.: US 11,101,576 B2
(45) Date of Patent: Aug. 24, 2021

(54) METHOD FOR JOINING TWO OR MORE ELECTRICAL CONDUCTORS, DEVICE FOR JOINING TWO OR MORE ELECTRICAL CONDUCTORS, AND ELECTRICAL CONNECTION BETWEEN TWO OR MORE CONDUCTORS

(71) Applicants: TE Connectivity Germany GmbH, Bensheim (DE); Technical University of Ilmenau, Ilmenau (DE)

(72) Inventors: Uwe Hauck, Kleinmanchow (DE); Helge Schmidt, Speyer (DE); Andre Martin Dressel, Lampertheim (DE); Rudi Blumenschein, Ellwangen (DE); Jean Pierre Bergmann, Erfurt (DE); Anna Regensburg, Waltenhofen-Memhölz (DE)

(73) Assignees: TE Connectivity Germany GmbH, Bensheim (DE); Technical University of Ilmenau, Ilmenau (DE)

( * ) Notice: Subject to any disclaimer, the term of this patent is extended or adjusted under 35 U.S.C. 154(b) by 0 days.

(21) Appl. No.: 16/517,030

(22) Filed: Jul. 19, 2019

(65) Prior Publication Data

US 2020/0028279 A1 Jan. 23, 2020

(30) Foreign Application Priority Data

Jul. 20, 2018 (DE) .......................... 102018212158.3

(51) Int. Cl.
*B23K 20/12* (2006.01)
*H01R 4/02* (2006.01)
(Continued)

(52) U.S. Cl.
CPC ........... *H01R 4/029* (2013.01); *B23K 20/122* (2013.01); *H01R 4/027* (2013.01); *H01R 4/625* (2013.01);
(Continued)

(58) Field of Classification Search
CPC .. B23K 20/122; B23K 20/12; B23K 2101/38; B23K 2103/10; B23K 2103/12;
(Continued)

(56) References Cited

U.S. PATENT DOCUMENTS 3,415,690 A * 12/1968 Richman ............. H01M 50/171
429/56
10,404,025 B2 9/2019 Mayer et al.
(Continued)

FOREIGN PATENT DOCUMENTS

DE 10 2017 114 994 B3 5/2018
DE 102017114994 B3 * 5/2018 ......... H01R 43/0207
(Continued)

OTHER PUBLICATIONS

FrictionStirWeldingAndProcess_Hovanski et al_pp. 1-324_Feb. 2017.*
(Continued)

*Primary Examiner* — Timothy J Thompson
*Assistant Examiner* — Guillermo J Egoavil
(74) *Attorney, Agent, or Firm* — Barley Snyder

(57) ABSTRACT

A connection assembly is provided and includes a first conductor, a second conductor and a friction stir welded connection connecting the first conductor and the second conductor, with the second conductor having a bundle of conductor wires. The friction stir welded connection is provided by a friction stir welding tool having a pin connecting a front side of the second conductor pressed onto the first conductor along a connecting direction between the first conductor and the second conductor.

19 Claims, 9 Drawing Sheets

(51) Int. Cl.
*H01R 4/62* (2006.01)
*H01R 43/02* (2006.01)
*B23K 103/10* (2006.01)
*B23K 103/12* (2006.01)
*B23K 101/38* (2006.01)

(52) U.S. Cl.
CPC ...... *H01R 43/0263* (2013.01); *B23K 2101/38* (2018.08); *B23K 2103/10* (2018.08); *B23K 2103/12* (2018.08)

(58) Field of Classification Search
CPC ........ H01R 4/027; H01R 4/029; H01R 4/625; H01R 4/02; H01R 4/62; H01R 4/64; H01R 4/06; H01R 4/023; H01R 4/20; H01R 11/01; H01R 11/11; H01R 11/12; H01R 43/02; H01R 43/0207; H01R 43/0263
USPC ................ 174/74 R, 129 R; 29/860
See application file for complete search history.

(56) References Cited

U.S. PATENT DOCUMENTS

| | | | | |
|---|---|---|---|---|
| 2014/0144015 A1* | 5/2014 | Mayer | ...................... | H01R 4/20 29/860 |
| 2014/0374138 A1* | 12/2014 | MacNaughton | ........ | H01R 11/11 174/129 R |
| 2014/0374466 A1* | 12/2014 | Coto | .................... | B23K 20/106 228/102 |
| 2019/0067648 A1* | 2/2019 | Newman | ............. | H01M 50/571 |
| 2019/0229572 A1* | 7/2019 | Ziems | .................... | H02K 1/165 |
| 2019/0388998 A1* | 12/2019 | Huggett | ................ | G01N 29/069 |
| 2020/0136278 A1* | 4/2020 | Forstmeier | ......... | H01R 43/0207 |

FOREIGN PATENT DOCUMENTS

| | | | |
|---|---|---|---|
| EP | 2615692 A1 | 7/2013 | |
| EP | 2735397 A1 | 5/2014 | |
| EP | 3175946 A2 | 6/2017 | |
| WO | 2017121989 A1 | 7/2017 | |
| WO | WO-2017121989 A1 * | 7/2017 | ............. B21F 27/10 |

OTHER PUBLICATIONS

Friction stir welding—Wikipedia—pp. 1-10_Nov. 2016.*
FrictionStirWeldingAndProcessi_Hovanski et al_pp. 1-324_Feb. 2017.*
Greaves U-Bolt GND Clamps_pp. 86-90_Jun. 2018.*
Review FSW Pin Profile_Emamian et al._pp. 1-18_Apr. 2017.*
German Office Action, Appl. No. 10 2018 212 158.3, dated Feb. 11, 2019, 5 pages.
Abstract of related application, WO2019007454, dated Jan. 10, 2019, 1 page.
Extended European Search Report, European Patent Application No. 19186408.1, dated Dec. 16, 2019, 7 pages.
Machine translation abstract of EP 3175946, dated Jun. 7, 2017, 2 pages.

* cited by examiner

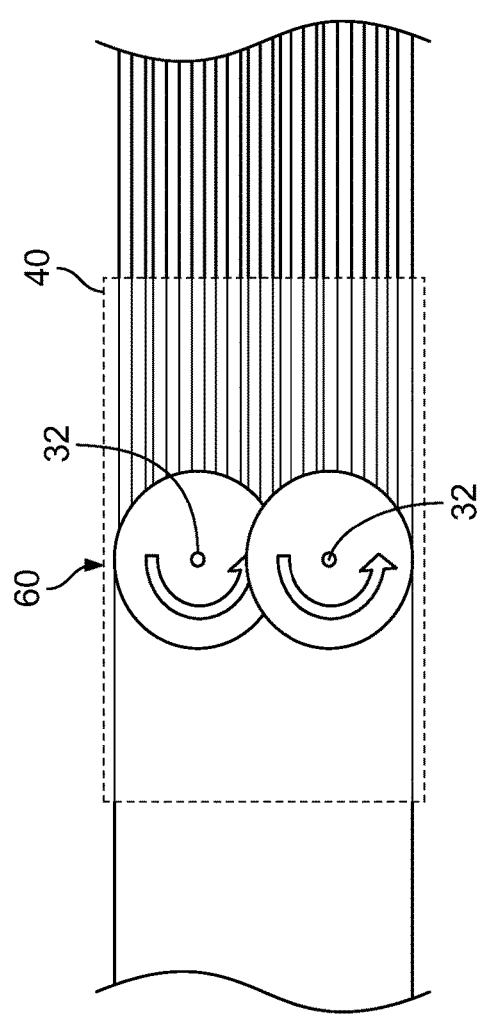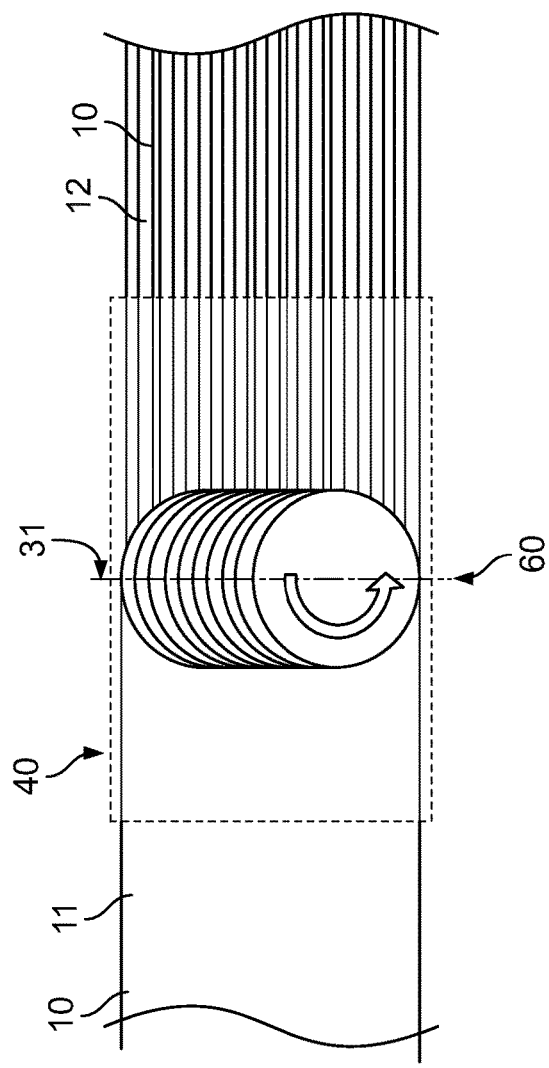

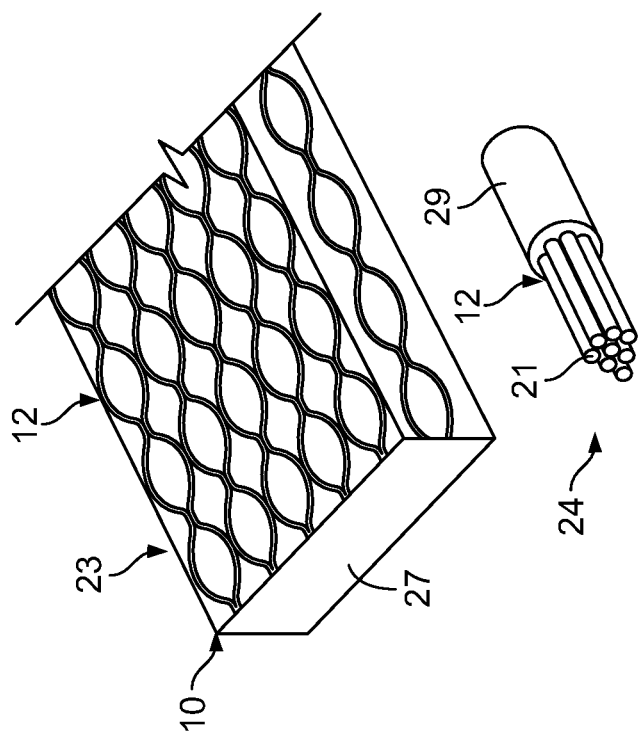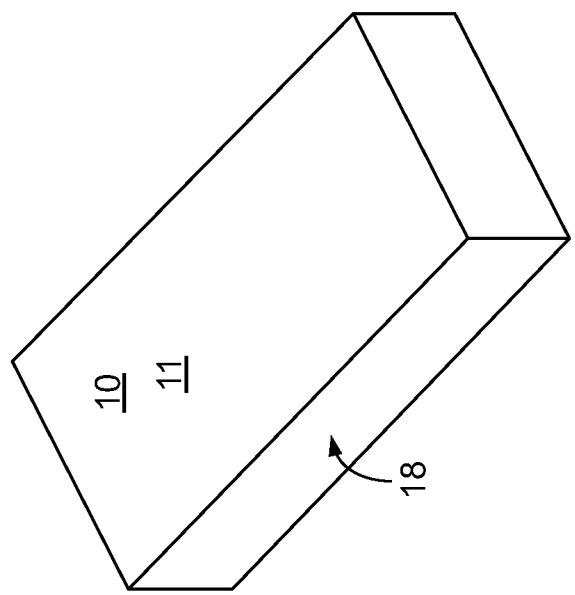
Fig. 8

METHOD FOR JOINING TWO OR MORE ELECTRICAL CONDUCTORS, DEVICE FOR JOINING TWO OR MORE ELECTRICAL CONDUCTORS, AND ELECTRICAL CONNECTION BETWEEN TWO OR MORE CONDUCTORS

CROSS-REFERENCE TO RELATED APPLICATION

This application claims the benefit of the filing date under 35 U.S.C. § 119(a)-(d) of German Patent Application No. 10 2018 212 158.3, filed on Jul. 20, 2018.

FIELD OF THE INVENTION

The invention relates to a connection assembly for joining a plurality of electrical conductors and, more particularly, to a connection assembly for joining a plurality of electrical conductors using a friction stir welding tool.

BACKGROUND

Use of friction stir welding to permanently connect a plurality of conductors is known. However, connections using friction stir welding are typically rigid and therefore have limited applications.

The problem of the invention is to provide a solution with a wider scope of application.

SUMMARY

According to the invention, a connection assembly according to the invention is provided and generally includes a first conductor, a second conductor and a friction stir welded connection connecting the first conductor and the second conductor. The second conductor includes a bundle of conductor wires. The friction stir welded connection is provided by a friction stir welding tool having a pin connecting a front side of the second conductor pressed onto the first conductor along a connecting direction between the first conductor and the second conductor.

BRIEF DESCRIPTION OF THE DRAWINGS

The invention will now be described by way of example with reference to the accompanying Figures, of which:

FIG. 6 shows a schematic depiction of a friction stir welding step R performed by a connection assembly according to the invention;

FIG. 7 shows a schematic depiction of another friction stir welding step R performed by a connection assembly according to the invention;

FIG. 8 shows a perspective view of various conductors for connecting to each other using a connection assembly according to the invention;

DETAILED DESCRIPTION OF THE EMBODIMENTS

Figure 1:
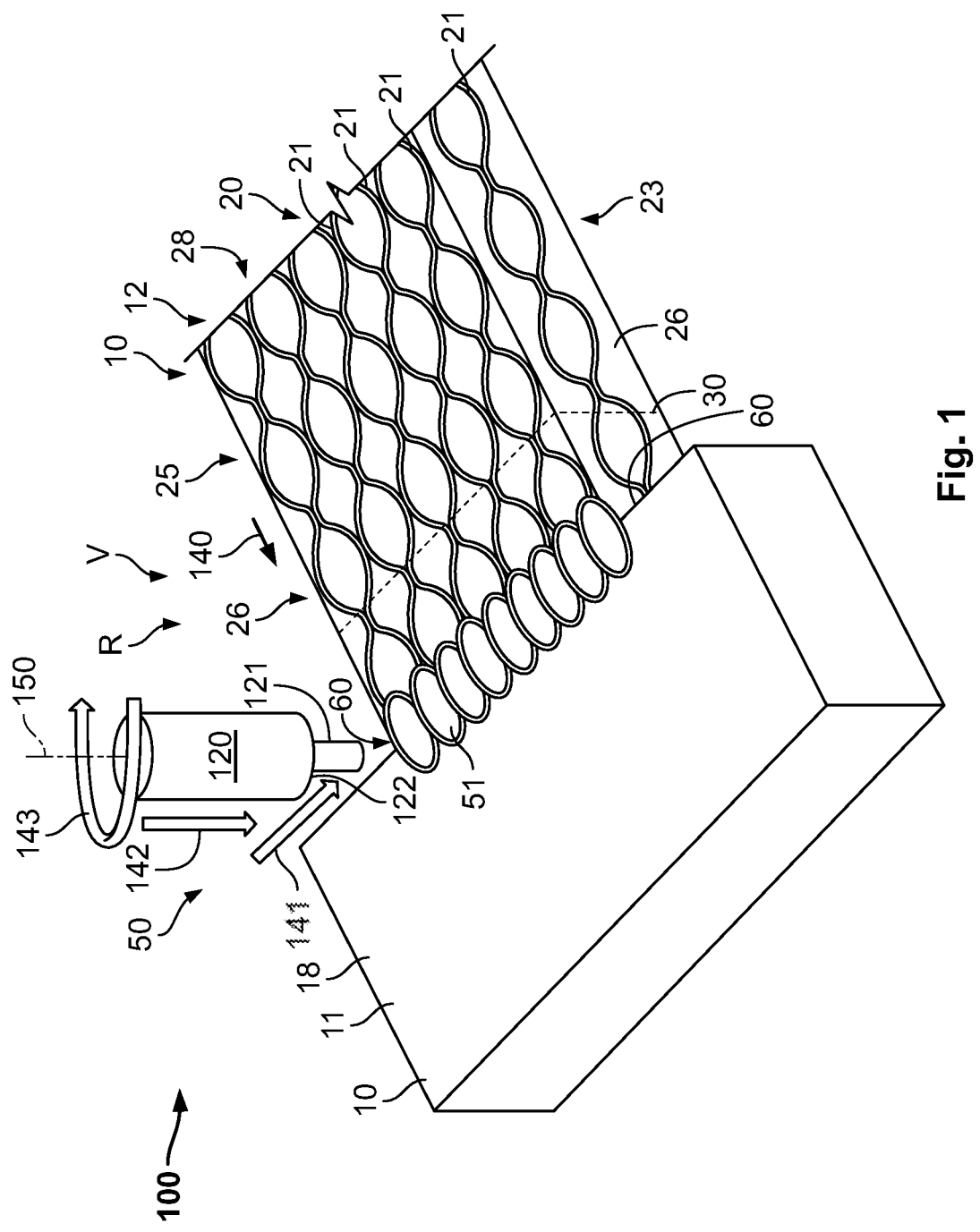
FIG. 1 shows a perspective view of a connection assembly and method for joining two or more electrical conductors showing a friction stir welding tool according to the invention.

With reference to FIG. 1, a connection assembly and method V for connecting two electrical conductors 10 according to the invention is shown and uses a friction stir welding tool 120. As shown, a first conductor 10, 11 is provided and is a solid conductor 18 consisting, for example, of an elongate piece of metal in the shown embodiment. A second conductor 10, 12 is also provided and includes a bundle 20 of conductor wires 21 (see FIG. 8). According to the invention, the second conductor 12 is more flexible than the first conductor 11. In an exemplary embodiment, as shown, the second conductor 12 may include a conductor mesh 23 wherein individual conductor wires 21 are interwoven with one another or in which several bundles 20 of conductor wires 21 are interwoven with one another. Using a conductor mesh 23 can enable a particularly high degree of flexibility. A conductor mesh 23 may include several bundles of conductor wires 21 which are interwoven with one another. Alternatively, individual conductor wires can also be interwoven with one another, for example when the electrical power to be transported is appropriately low.

The two conductors 11, 12 can in particular be strip-shaped conductors 28 which are substantially larger along one dimension than along the two other dimensions.

As shown in FIG. 1, a friction stir welding tool 120 is provided to perform a friction stir welding step R by the connection assembly. The friction stir welding tool 120 includes a pin 121 used to connect the two conductors 11, 12. First, a front side 27 of the second conductor 12 is pressed onto the first conductor 11 along a connecting direction 140 (see also FIG. 8). Then, the pin 121 is positioned and pressed into a connection area 60, along a press-on direction 142, between the first conductor 11 and the second conductor 12, and the friction stir welding tool 120 rotates along a rotation direction 143 that runs around a rotation axis 150. Heat is provided to heat and/or melt the first conductor 11 and a second conductor 12 along a region of the connection area 60. The heated volume is combined with rotation of the pin 121 that is additionally moved along a movement direction 141 that also runs along the connection area 60. After the friction stir welding tool 120 has passed, the heated sections cool down and produce a secure a welded connection between the two conductors 11, 12.

The connection assembly and method V creates a welded connection, such as a connection seam 51, providing a welded electrical connection 50 between the conductors 10.

Figure 2:
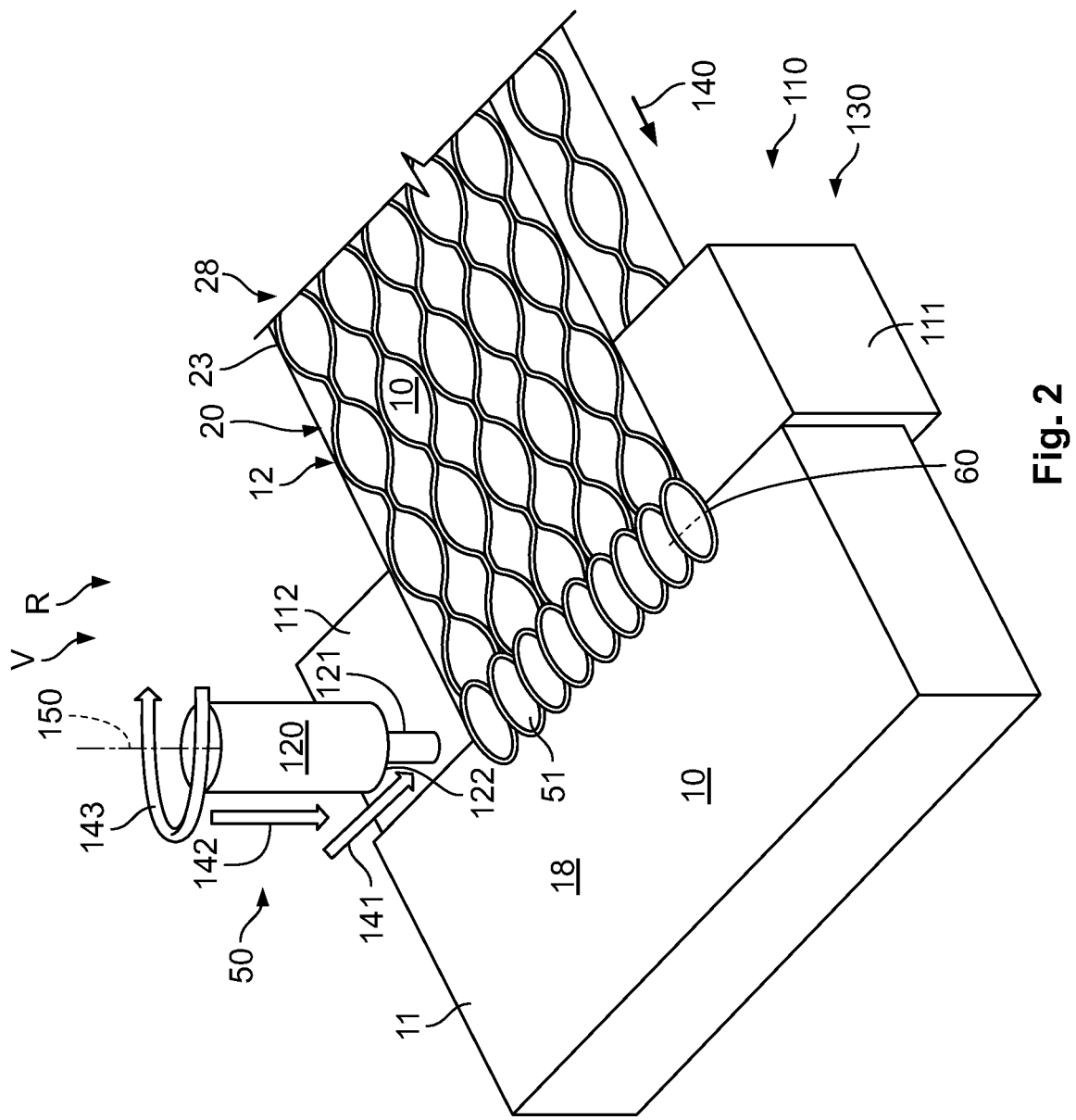
FIG. 2 shows a perspective view of another connection assembly and method for joining two or more electrical conductors using the friction stir welding tool of FIG. 1 and a clamp according to the invention.

With reference to FIG. 2, another connection assembly and method V for connecting two electrical conductors 10 according to the invention using a friction stir welding tool 120 is shown. The second conductor 10, 12 is laterally clamped during the friction stir welding R. As a result, the conductor wires 21 are held and can yield less extensively to the pin 121. As a result, better connection between the conductors 10 is obtained. In order to obtain such a clamping force, a clamp device 100 is provided and generally includes a clamp 110 with a first clamping jaw 111 and a second clamping jaw 112 positioned opposite the first clamping jaw 111. The two clamping jaws 111, 112 press lateral surfaces 26 of the second conductor 12 and are positioned adjacent the connection area 60 (along two opposing clamping directions 161, 162). The clamping jaws 111, 112 prevent the conductor wires 21 from deflecting as the pin 121 moves along a movement direction 141. Further, the friction stir welding tool 120 prevents movement of the conductor wires 21 along an upper side 25 thereof, for example by shoulders 122 of the friction stir welding tool 120 that are positioned adjacent to the pin 121.

In the embodiment shown, the clamping jaws 111, 112 are positioned adjacent the first conductor 10, 11 along the connecting direction 140. If necessary, a gap is provided between the clamping jaws 111, 112 and the first conductor 10, 11 (along the connecting direction 140). However, a distance of the gap, between the clamping jaws 111, 112 and the first conductor 10, 11, should not be too large in order to minimize movement of the conductor wires 21. For example, the distance should be equal or smaller than three times the thickness of the pin 121. In other words, the clamping jaw 111, 112 cannot be more than 1.5 times a width of a friction stir welding head 120 from the first conductor 10, 11.

In the shown embodiment, the clamp 110 is considered a compression device 130, with which the conductor wires 21 and thus the conductor 12 are compressed. Such compression can improve the welded connection, since the density of the conductor 12 is increased at the connection area 60. As a result, a stronger welded connection is possible.

Additionally, the bundle of conductor wires 21 can be compacted and compressed before and/or during friction stir welding by the pin 121. Such compacting and compression can take place, for example, by mechanical pressing-together and/or an at least partial joining of the conductor wires 21 for example through ultrasound welding. The compacting and compression can be carried out in particular by the clamp 110, which means that this clamp 110 has a dual function. The compacting and compression can at the same time, so that these two steps are performed together and time is saved.

Alternatively, in another embodiment, the clamp 110 could also be one single clamping element that includes a tapering receptacle (not shown), for example, which provides for automatic clamping along various directions.

Figure 3:
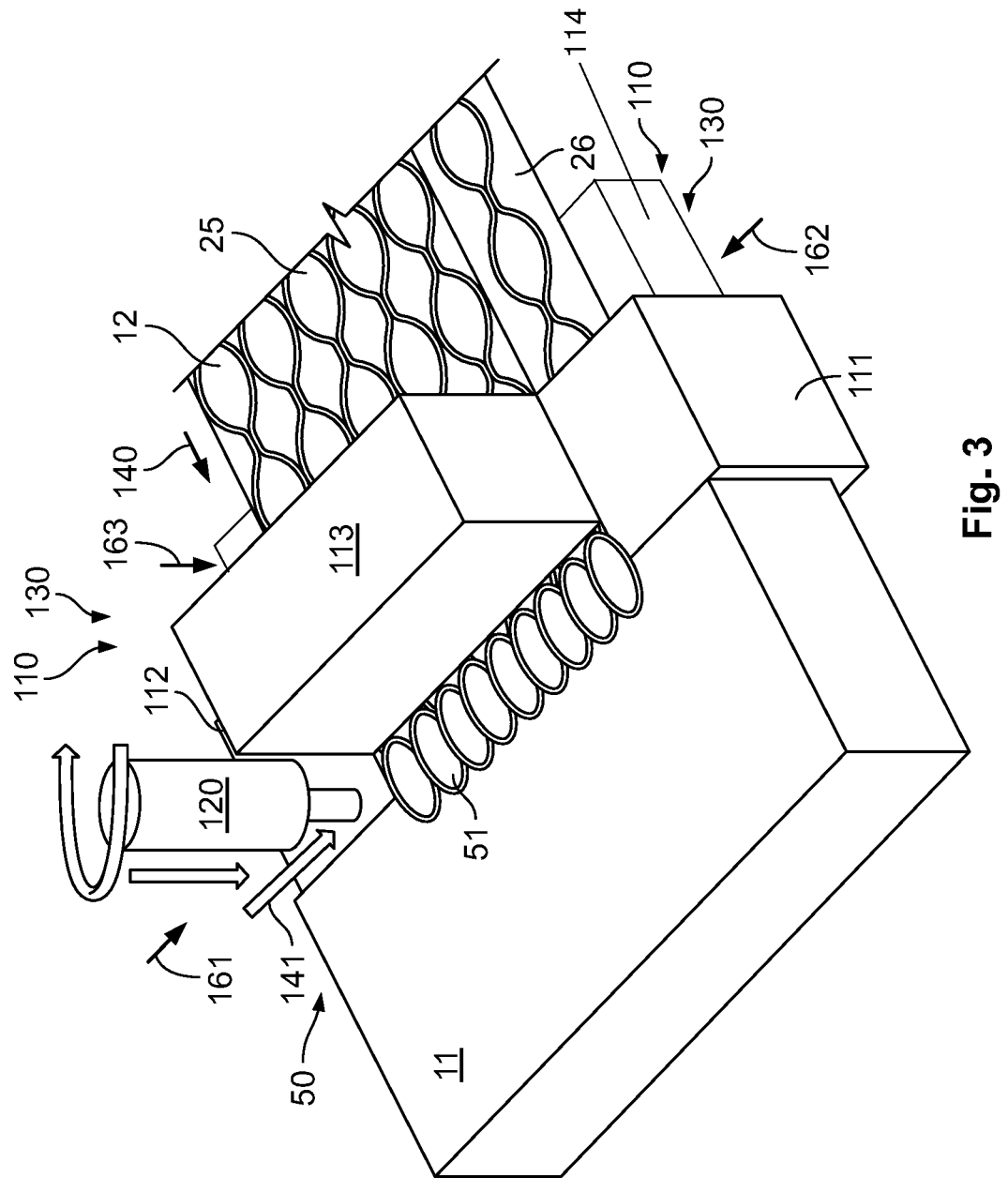
FIG. 3 shows a perspective view of another connection assembly and method for joining two or more electrical conductors using the friction stir welding tool of FIG. 1 and another clamp according to the invention.

With respect to FIG. 3, another connection assembly and method V for connecting two electrical conductors 10 according to the invention using a friction stir welding tool 120 is described.

As shown, a third clamping jaw 113 is provided and positioned alongside the lateral clamping jaws 111, 112. The third clamping jaw 113 presses an upper side 25 of the second conductor 12 close to the connection area 60 along a clamping direction 163.

The third clamping jaw 113 is spaced further apart, along the connecting direction 140, from the first conductor than the two clamping jaws 111, 112, in order to accommodate space for the friction stir welding head 120.

Through the combination of the three clamping jaws 111, 112, 113 and a fixed element 114, positioned along an underside of the conductor 12, the conductor 12 is clamped on all sides, along a perimeter 30 thereof. At the same time, the conductor 12 is compacted and compressed by the clamp 110, so that the clamp 110 is, at the same time, a compression device 130.

According to embodiments of the connection assembly and method V according to the invention, it is particularly possible to produce connections between copper and aluminum, which are otherwise difficult to achieve. For example, the conductors 10 can contain copper and/or aluminum and/or alloys with these elements. Of course, conductors 11, 12 consisting of the same material can be used. The connection assembly and method V is particularly robust when it is used to connect aluminum and copper, i.e. when one electrical conductor includes aluminum and the other conductor includes copper. The conductors 11, 12 can consist of aluminum and copper respectively or alloys containing these metals. When connected using the connection assembly and method V according to the invention, the two metals are mixed with one another, and a particularly robust connection is created. In an alternative embodiment, the conductors 11, 12 can also consist of the same material, for example of copper or aluminum or alloys containing these materials.

Figure 4:
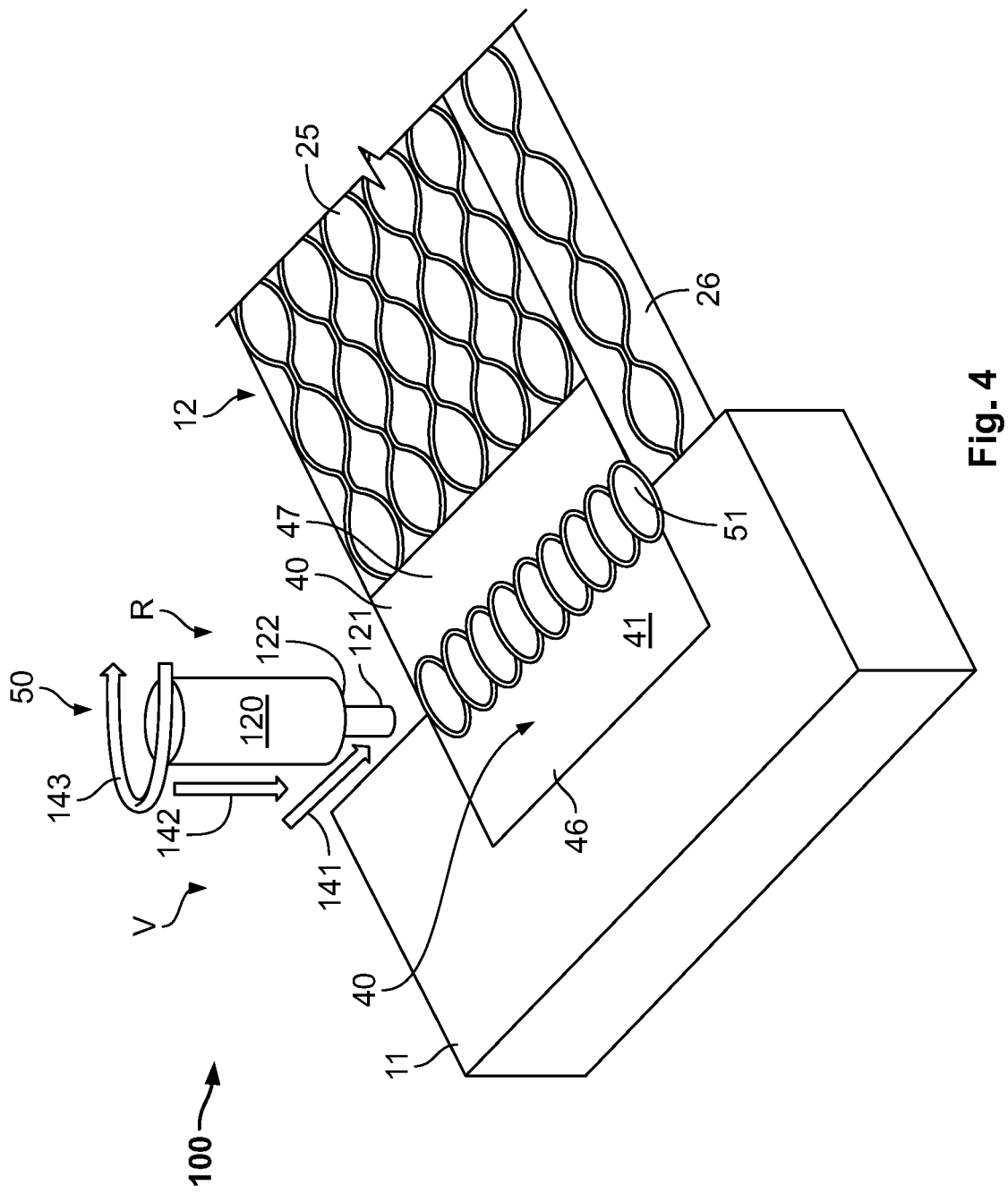
FIG. 4 shows a perspective view of a connection assembly and method for joining two or more electrical conductors using the friction stir welding tool of FIG. 1 and a cover according to the invention.

With respect to FIG. 4, another connection assembly and method V for connecting two electrical conductors 10 according to the invention is shown, and again uses using the friction stir welding tool 120. However, a cover 40 is provided and partially overlaps each of the conductors 11, 12. A first section 46 of the cover 40 overlaps the first conductor 11, a second section 47 of the cover 40 overlaps the second conductor 12. The cover 40 can be used to secure the conductor wires 21. Furthermore, the cover 40 can make the welded connection 50 more stable. The cover 40 can be at least partially fuse the first conductor 11 and the second conductor 12 together during the friction stir welding step R. Through suitable selection of the material for the cover 40, it is possible to achieve improved flow properties or extensive cross-linking during the friction stir welding step R. This can be accomplished, for example, by the cover 40 having materials which melt at lower temperatures than the conductors 11, 12. In an exemplary embodiment of the invention, the cover 40 can be fused on or include fused-on areas. A mutual diffusion of the materials involved can represent a robust result and generate a targeted material property in the transition zone between the conductor substances.

In an exemplary embodiment of the invention, the cover 40 is a plate 41, for example a metal plate or a metal sheet. A plane defined by the cover 40 runs perpendicular to a plane defined by the connection seam 51 or the connection area 60.

Figure 5:
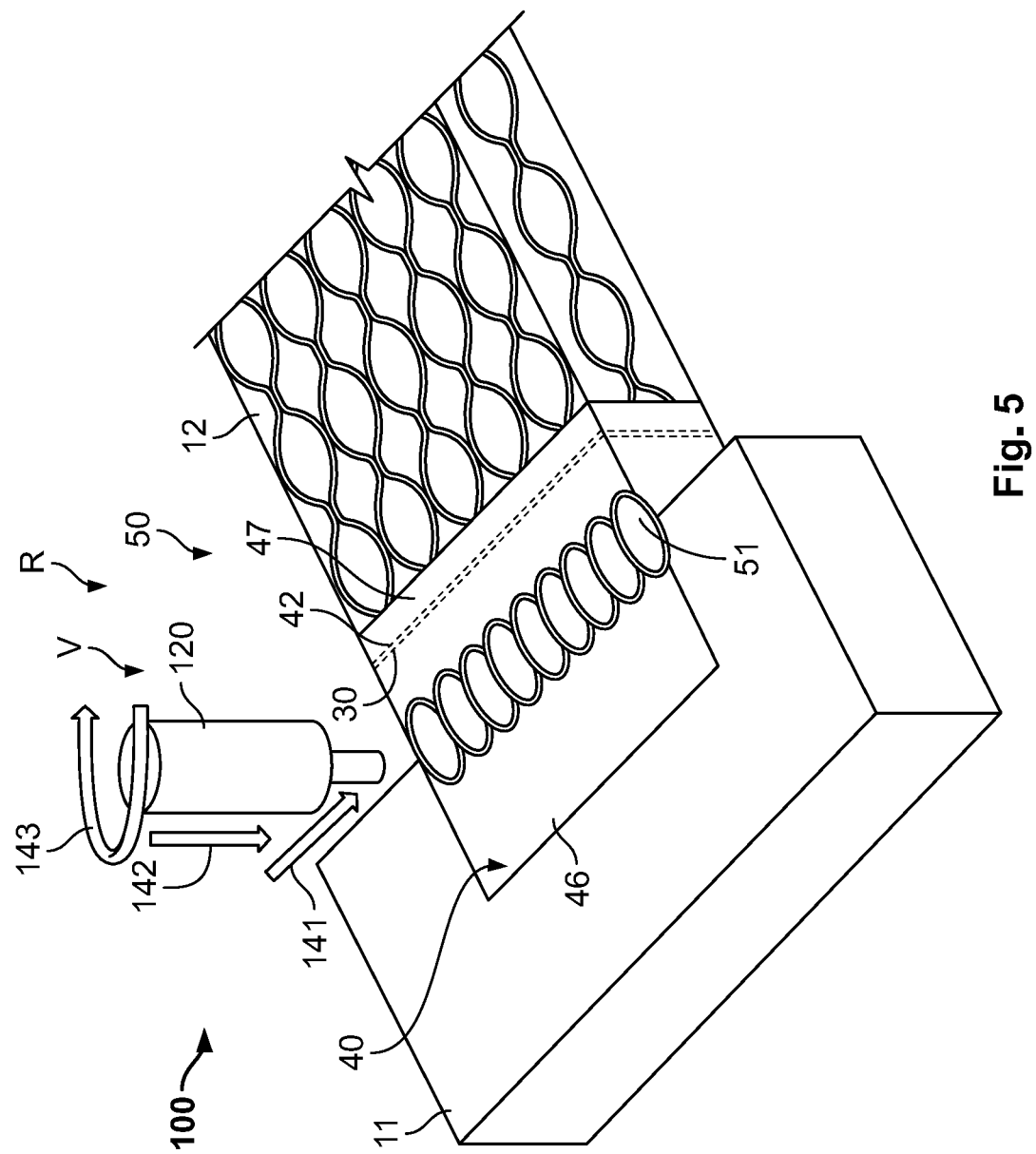
FIG. 5 shows a perspective view of connection assembly and method for joining two or more electrical conductors using the friction stir welding tool of FIG. 1 and another cover according to the invention.

With respect to FIG. 5, another connection assembly and method V for connecting two electrical conductors 10 according to the invention is shown. This shown assembly differs with respect to the shape of the cover 40 in FIG. 4. In the region of the second section 47, the cover 40 has a U-shaped cross-section 42, so that the cover 40 surrounds the second conductor 12, at least close to the connection area 60 along the majority of the perimeter 30 of the conductor 12. Compression can also be obtained through such a U-shaped cross-section 42. The cover 40 can in this manner receive and/or secure the conductor 12 at least in part. Accordingly, the cover 40 can laterally support the conductor 12 with the bundle of conductor wires 21. As a result, movement of the conductor wires 21 during the friction stir welding can be reduced. The cover 40 can fulfill a clamping function, at least in part, as well.

The cover 40 can be manufactured from a material that provides enhanced flow-improving and/or crosslinking-activating effect during the friction stir welding step R, so that the welded connection is more stable. The cover 40 may include solders, for instance, and/or be coated with solders. Tin or zinc, for example, can be present.

In order to enable good positioning of the conductor wires 21, the cover 40 can at least partly surround a conductor with a bundle of conductor wires 21. For example, this can take place with the U-shaped cross-section into which the conductor 12 can be received.

With respect to FIGS. 6 and 7, variants of a friction stir welding step R of a connection assembly and method V for connecting two electrical conductors 10 is shown. FIG. 6 shows spot-welding, which means that single connection points 32 are created. In a configuration which enables a particularly strong connection, welding can take place along a line. FIG. 7 shows continuous welding along a line 31, which means that a continuous connection seam 51 is created. The line 31 can, for example, run along the entire length of a connection area in order to avoid peaks of force and to generate a high electrically effective connection cross-section which resultantly reduces the creation of heat. In both cases, a cover 40 can be additionally used respectively.

With respect to FIG. 8, various conductors 11, 12 are shown. It should be understood within the spirit of the invention that a connection assembly and method V according to the invention that uses the friction stir welding tool 120 can connect one or more of the conductors 11, 12 shown. In previous embodiments shown, a conductor mesh 23 is used as an exemplary electrical conductor 12. However, as an alternative, it is also possible to use a stranded conductor 24 that has several conductor wires 21 running parallel and covered by insulation 29. In this configuration, the stranded conductor 24 includes conductors that are widespread which means that the connection assembly can be applied in a wide scope. In a stranded conductor 24, several conductor wires can run alongside one another without being interwoven with one another.

At least one of the conductors 11, 12 can have an elongate configuration, in which the extent in one dimension is larger than in the other dimensions, for example larger by a factor of 5. The conductor can be configured to be strip-shaped, for example, in order to enable twisting.

Both conductors 11, 12 can have a bundle of conductor wires 21 in order to obtain a particularly flexible connection.

Figure 9:
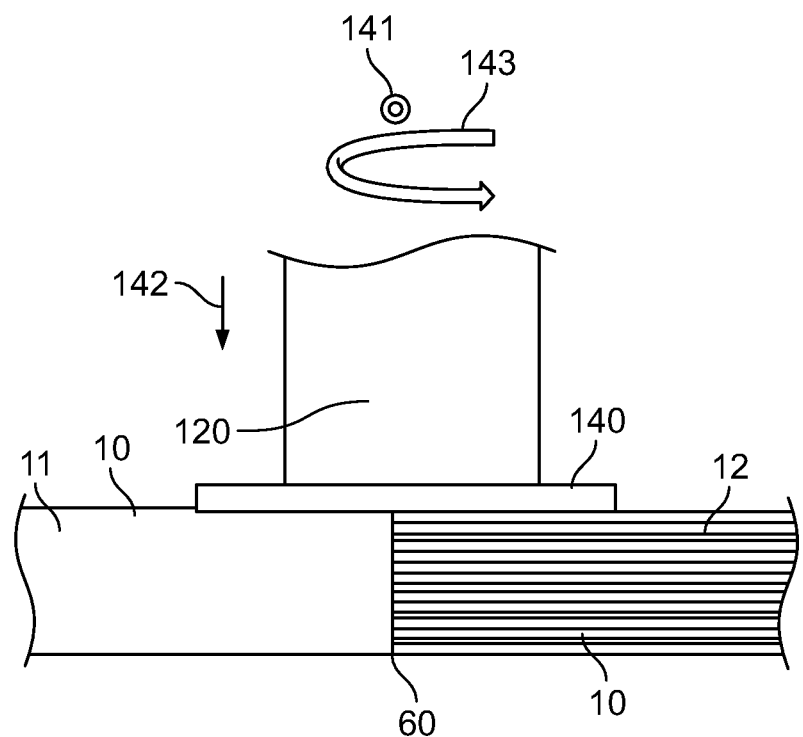
FIG. 9 shows a side view of a friction stir welding head used to connect one or more using a connection assembly according to the invention.
Figure 10:
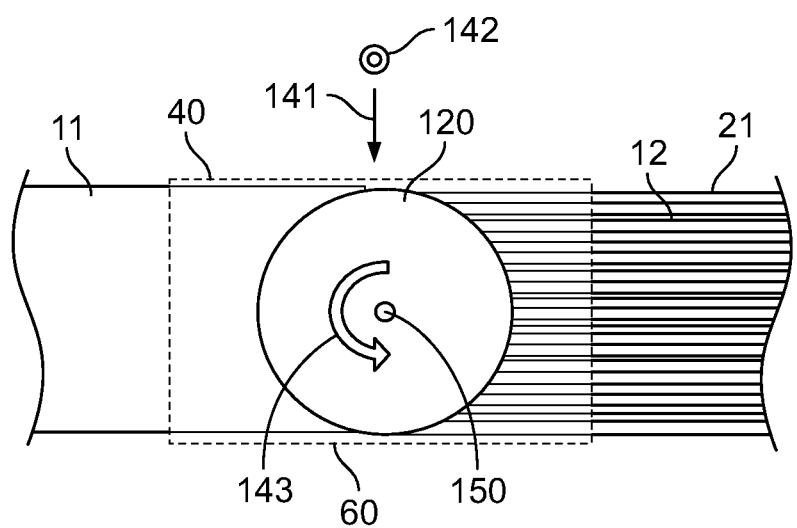
FIG. 10 shows a top view of a friction stir welding head used to connect one or more using a connection assembly according to the invention.

With respect to FIGS. 9 and 10, a friction stir welding head 120 is shown and used to connect the two conductors 11, 12 by a connection assembly and method V for connecting two electrical conductors 10 according to the invention. In the configuration shown, the friction stir welding tool 120 is sized to sufficiently cover the two conductors 11, 12 along their entire width.

Figure 11:
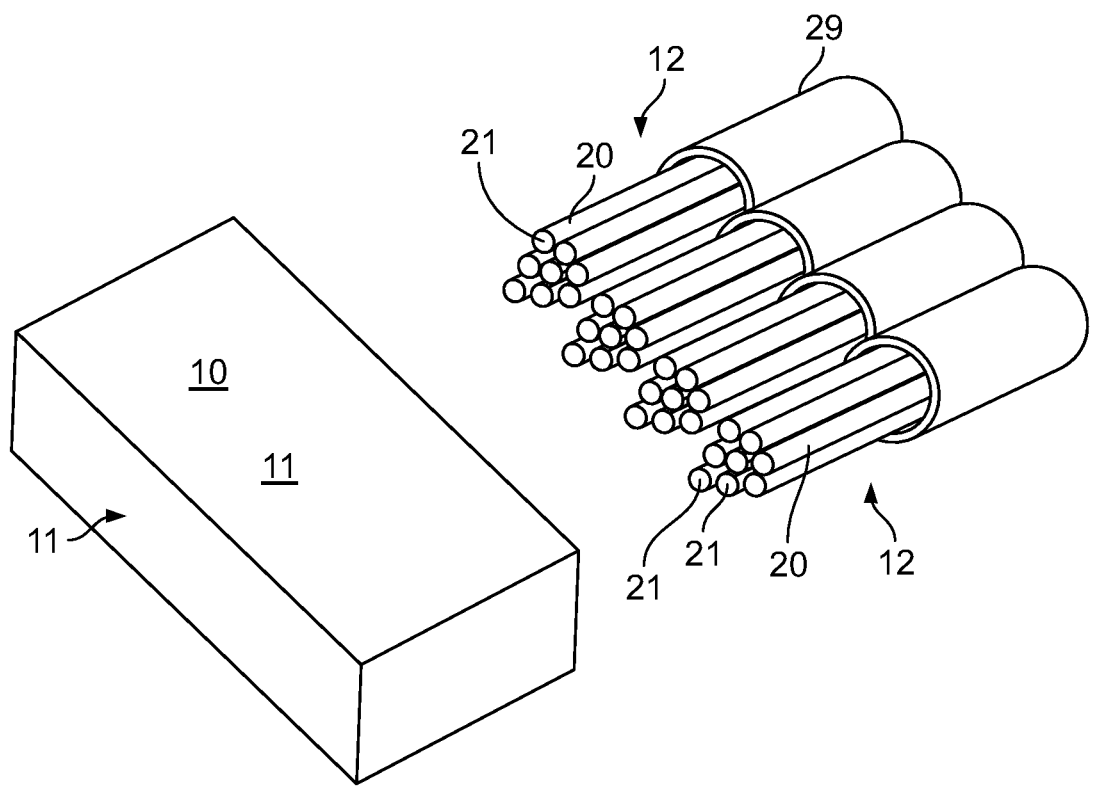
FIG. 11 shows a perspective view of a first conductor and a second conductor before they are connected using a connection assembly and method for joining two or more electrical conductors using a friction stir welding tool according to the invention.
Figure 12:
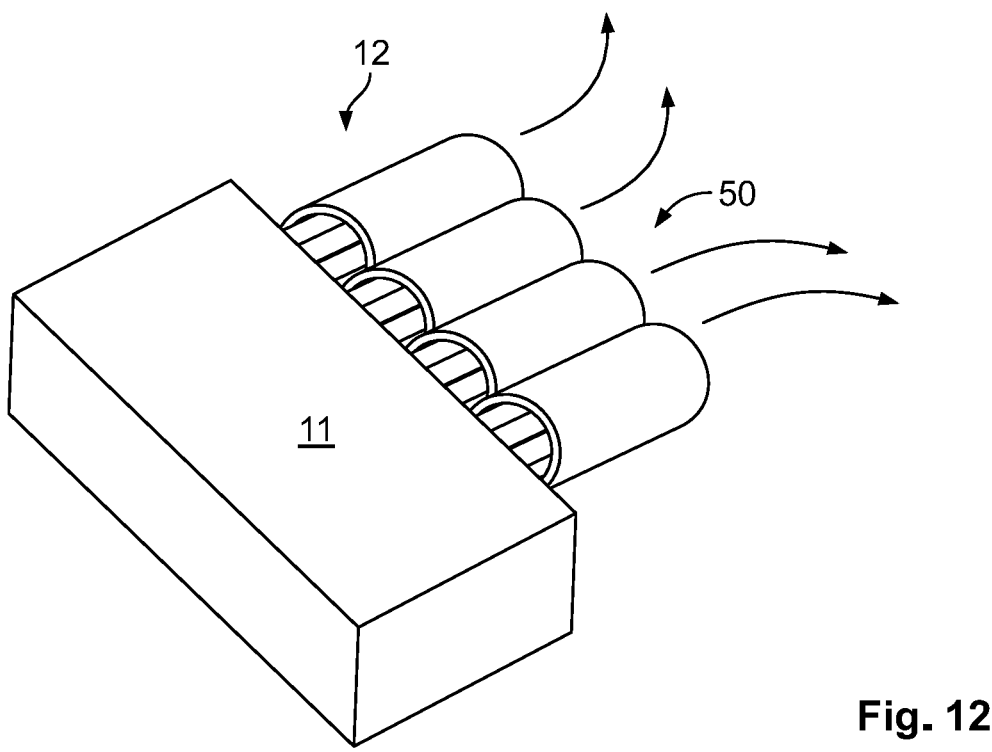
FIG. 12 shows a perspective view of a welded connection of the first conductor and second conductor of FIG. 11 after they are connected using a connection assembly and method for joining two or more electrical conductors using a friction stir welding tool according to the invention.

FIG. 11 shows a further embodiment of a connection assembly and method V for connecting two electrical conductors 10 according to the invention, in which the multiple conductors 11, 12 are connected to one another. The first conductor 11 is again a rigid element to which several flexible second conductors 12 are attached. The second conductor 12 again includes a bundle 20 of conductor wires 21. As schematically depicted in FIG. 12, with such an embodiment it is possible to produce a welded connection 50 which splits in a Y shape and in the case of which the various second conductors 12 depart in different directions from the first conductor 11.

The connection assembly and method V for connecting two electrical conductors 10 according to the invention can, for example, also be used in order to produce a connection between a rigid conductor and two or more conductors with bundles of conductor wires. For example, a splitting connection, also referred to as a Y-splice, can be produced.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalent

What is claimed is:

1. A connection assembly, comprising:
   a first conductor;
   a second conductor having a bundle of conductor wires;
   a friction stir welding tool having a pin pressed along a connecting direction between the first conductor and the second conductor;
   a friction stir welded connection connecting the second conductor and the first conductor, the friction stir welded connection provided by the friction stir welding tool; and
   a clamp compressing an entire perimeter of the second conductor.

2. The connection assembly according to claim 1, wherein the first conductor is an elongated piece of metal.

3. The connection assembly according to claim 2, wherein the bundle of conductor wires is a conductor mesh.

4. The connection assembly according to claim 2, wherein the bundle of conductor wires is a stranded conductor.

5. The connection assembly according to claim 1, wherein the first conductor includes aluminum and the second conductor includes copper.

6. The connection assembly according to claim 1, wherein the clamp compresses the second conductor before the friction stir welded connection is provided by the friction stir welding tool.

7. The connection assembly according to claim 6, wherein the clamp includes a first clamping jaw and a second clamping jaw opposite the first clamping jaw and pressing lateral surfaces of the second conductor.

8. The connection assembly according to claim 7, wherein the clamp is spaced from the first conductor by a gap.

9. The connection assembly according to claim 8, wherein the gap is smaller than three times a thickness of the pin.

10. The connection assembly according to claim 1, wherein the clamp compresses the second conductor when the friction stir welded connection is provided by the friction stir welding tool.

11. The connection assembly according to claim 10, wherein the clamp includes a first clamping jaw and a second clamping jaw opposite the first clamping jaw and pressing lateral surfaces of the second conductor.

12. The connection assembly according to claim 1, wherein the friction stir welded connection is a continuous connection seam.

13. The connection assembly according to claim 1, further comprising a cover overlapping a portion of the first conductor and a portion of the second conductor.

14. The connection assembly according to claim 13, wherein the cover is u-shaped and partially surrounds a bundle of conductors of the second conductor.

15. The connection assembly according to claim 13, wherein the cover is a metal plate having a plane running perpendicular to a plane defined by the friction stir welded connection.

16. The connection assembly according to claim 1, wherein the pin is heated and pressed into a connection area of the first conductor and the second conductor.

17. The connection assembly according to claim 16, wherein the pin rotates and provides heat along a region of the connection area.

18. A connection assembly, comprising:
a first conductor;
a second conductor having a bundle of conductor wires;
a friction stir welded connection connecting the second conductor and the first conductor, the friction stir welded connection provided by a friction stir welding tool having a pin pressed along a connecting direction between the first conductor and the second conductor; and
a cover overlapping a portion of the first conductor and a portion of the second conductor, the cover is u-shaped and partially surrounds the bundle of conductor wires of the second conductor.

19. A connection assembly, comprising:
a first conductor;
a second conductor having a bundle of conductor wires;
a friction stir welding tool having a pin pressed along a connecting direction between the first conductor and the second conductor;
a friction stir welded connection connecting the second conductor and the first conductor, the friction stir welded connection provided by the friction stir welding tool; and
a clamp laterally compressing the second conductor, the clamp includes a first clamping jaw and a second clamping jaw opposite the first clamping jaw and pressing lateral surfaces of the second conductor, the clamp is spaced from the first conductor by a gap that is smaller than three times a thickness of the pin.

* * * * *